(12) United States Patent
Kato et al.

(10) Patent No.: US 10,978,252 B2
(45) Date of Patent: Apr. 13, 2021

(54) ELECTRET SHEET

(71) Applicant: SEKISUI CHEMICAL CO., LTD., Osaka (JP)

(72) Inventors: Tetsuhiro Kato, Osaka (JP); Nobuto Kamiya, Osaka (JP); Masahiro Tsuchiya, Osaka (JP); Yuuta Katsurayama, Osaka (JP); Yasuyuki Shirasaka, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 25 days.

(21) Appl. No.: 16/074,807

(22) PCT Filed: Feb. 3, 2017

(86) PCT No.: PCT/JP2017/004124
§ 371 (c)(1),
(2) Date: Aug. 2, 2018

(87) PCT Pub. No.: WO2017/135458
PCT Pub. Date: Aug. 10, 2017

(65) Prior Publication Data
US 2019/0057816 A1 Feb. 21, 2019

(30) Foreign Application Priority Data

Feb. 4, 2016 (JP) .............................. JP2016-019530
Feb. 4, 2016 (JP) .............................. JP2016-019531
Feb. 4, 2016 (JP) .............................. JP2016-019535

(51) Int. Cl.
*H01G 7/02* (2006.01)
*C08J 9/00* (2006.01)
*C08J 9/10* (2006.01)

(52) U.S. Cl.
CPC .............. *H01G 7/023* (2013.01); *C08J 9/00* (2013.01); *H01G 7/02* (2013.01); *C08J 9/103* (2013.01); *C08J 2201/026* (2013.01); *C08J 2201/03* (2013.01); *C08J 2323/10* (2013.01); *C08J 2323/14* (2013.01)

(58) Field of Classification Search
None
See application file for complete search history.

(56) References Cited

U.S. PATENT DOCUMENTS

| 4,588,537 A * | 5/1986 | Klaase ............... B01D 39/1623 264/248 |
| 5,556,618 A * | 9/1996 | Ando ..................... H01G 7/023 424/404 |
| 2014/0091249 A1* | 4/2014 | Uchida .................... C08J 3/246 252/62.9 R |
| 2015/0295163 A1 | 10/2015 | Komeda et al. |

FOREIGN PATENT DOCUMENTS

| EP | 3 118 873 | 1/2017 |
| JP | 8-284063 | 10/1996 |
| JP | 2009-253050 | 10/2009 |
| JP | 2011-216661 | 10/2011 |
| JP | 2014-011282 | 1/2014 |
| JP | 2014-34592 | 2/2014 |
| JP | 2014400868 | 6/2014 |
| WO | 2015/137351 | 9/2015 |

OTHER PUBLICATIONS

International Search Report dated Apr. 25, 2017 in International (PCT) Application No. PCT/JP2017/004124.
Extended European Search Report dated Sep. 11, 2019 in corresponding European Patent Application No. 17747609.0.
Notice of Reasons for Refusal dated Aug. 18, 2020 dated Aug. 18, 2020 in corresponding Japanese Patent Application No. 2017-019862, with English Translation.
Notice of Reasons for Refusal dated Sep. 15, 2020 in corresponding Japanese Patent Application No. 2017-019853, with English Translation.
Notice of Reasons for Refusal dated Feb. 2, 2021 in corresponding Japanese Patent Application No. 2017-019853, with machine English Translation.

* cited by examiner

*Primary Examiner* — Christopher M Rodd
(74) *Attorney, Agent, or Firm* — Wenderoth, Lind & Ponack, L.L.P.

(57) ABSTRACT

The present invention provides an electret sheet that retains high piezoelectricity under high-temperature condition. The electret sheet of the invention is characterized by including a charged porous sheet, in which the electret sheet has a volume resistivity of $1.0 \times 10^{15}$ $\Omega \cdot$cm or more at 25° C. and a dielectric breakdown voltage of 7 kV or more at 25° C. The electret sheet preferably having a volume resistivity of $1.0 \times 10^{14}$ $\Omega \cdot$cm or more at 37° C. and a dielectric breakdown voltage of 7 kV or more at 37° C. retains excellent piezoelectricity even after being left under a high-temperature atmosphere over a long period.

7 Claims, No Drawings

ELECTRET SHEET

TECHNICAL FIELD

The present invention relates to an electret sheet.

BACKGROUND ART

An electret sheet is a permanently internally charged material obtained by injecting electric charges into an insulating polymer material.

It is known that a foamed sheet made of a synthetic resin exhibits very high piezoelectricity comparable to that of ceramics by charging a cell membrane forming bubbles and their vicinities. It has been proposed to apply an electret that uses such a foamed sheet made of the synthetic resin to acoustic pickups, various pressure sensors, and the like by utilizing an excellent sensitivity of the electret.

As an electret sheet, Patent Literature 1 discloses an electret sheet including a chlorinated polyolefin, which has a surface charge density of $1 \times 10^{-10}$ coulomb/cm$^2$ or more.

CITATION LIST

Patent Literature

Patent Literature 1: Japanese Patent Application Laid-Open No. Hei. 8-284063

SUMMARY OF INVENTION

Technical Problem

However, the electret sheet of Patent literature 1 has a problem in that the piezoelectricity decreases under high-temperature condition.

The present invention provides an electret sheet that retains high piezoelectricity even under high-temperature condition.

Solution to Problem

An electret sheet of a first aspect of the invention is characterized by including a charged porous sheet, in which the electret sheet has a volume resistivity of $1.0 \times 10^{15}$ Ω·cm or more at 25° C. and a dielectric breakdown voltage of 7 kV or more at 25° C.

The electret sheet of a second aspect of the invention is characterized by including a charged porous sheet, in which the electret sheet has a volume resistivity of $1.0 \times 10^{15}$ Ω·cm or more under a constant pressure load of 100 kPa at 25° C. and a dielectric breakdown voltage of 5.5 kV or more under a constant pressure load of 100 kPa at 25° C.

The electret sheet of a third aspect of the invention is characterized by including a charged porous sheet, in which the electret sheet has a volume resistivity of $1.0 \times 10^{15}$ Ω·cm or more at 25° C. and a relative humidity of 60% and a dielectric breakdown voltage of 6 kV or more at 25° C. and a relative humidity of 60%.

Advantageous Effects of Invention

The electret sheet of the present invention having the above-described configuration reduces discharge of electric charges even under high-temperature condition and thus retains excellent piezoelectricity.

DESCRIPTION OF EMBODIMENTS

An electret sheet according to a first aspect of the invention will be described.

The electret sheet according to the first aspect of the invention is characterized by including a charged porous sheet, in which the electret sheet has a volume resistivity of $1.0 \times 10^{15}$ Ω·cm or more at 25° C. and a dielectric breakdown voltage of 7 kV or more at 25° C.

The electret sheet includes the charged porous sheet. The porous sheet is not particularly limited as long as a void portion is provided inside the porous sheet. However, a foamed synthetic resin sheet is preferable as the porous sheet. The synthetic resin constituting the foamed synthetic resin sheet is not particularly limited, and examples thereof include a polyolefin-based resin, such as a polyethylene-based resin and a polypropylene-based resin, polyvinylidene fluoride, polylactic acid, and a liquid crystal resin. The synthetic resin preferably includes a polyolefin-based resin, and more preferably includes a polypropylene-based resin.

The synthetic resin is preferably excellent in insulation. Specifically, the synthetic resin preferably has a volume resistivity value of $1.0 \times 10^{10}$ Ω·cm or more. Here, the volume resistivity value is measured one minute after applying a voltage of 500 V according to JIS K6911 (hereinafter simply referred to as a "volume resistivity value").

The synthetic resin has the above-described volume resistivity value of preferably $1.0 \times 10^{12}$ Ω·m or more, and more preferably $1.0 \times 10^{14}$ Ω·m or more in order to obtain the electret sheet having more excellent piezoelectricity.

Examples of the polyethylene-based resin include an ethylene homopolymer and a copolymer of ethylene and at least one kind of α-olefins having 3 to 20 carbon atoms in which the ethylene component exceeds 50% by mass. Examples of the ethylene homopolymer include low-density polyethylene (LDPE) obtained by radical polymerization under a high pressure, and medium-to-low pressure processed high density polyethylene (HDPE) obtained by polymerization under medium to low pressure in the presence of a catalyst. Linear low-density polyethylene (LLDPE) can be obtained by copolymerization of ethylene and α-olefin. Examples of the α-olefin include propylene, 1-butene, 1-pentene, 1-hexene, 4-methyl-1-pentene, 1-octene, 1-nonene, 1-decene, 1-tetradecene, 1-hexadecene, 1-octadecene, and 1-eicosene. Of these, the α-olefin having 4 to 10 carbon atoms is preferable. Note that the content of the α-olefin in the linear low-density polyethylene is usually 1 to 15% by mass.

The polypropylene-based resin is not particularly limited as long as it includes more than 50% by mass of a propylene component. Examples thereof include a propylene homopolymer (homopolypropylene), and a copolymer of propylene and at least one kind of olefins having 20 or less carbon atoms other than propylene. Note that the polypropylene-based resin may be used alone, or two or more kinds thereof may be used in combination. Further, the copolymer of propylene and at least one kind of olefins having 20 or less carbon atoms other than propylene may be either a block copolymer or a random copolymer.

Note that examples of the α-olefin to be copolymerized with propylene include ethylene, 1-butene, 1-pentene, 4-methyl-1-pentene, 1-hexene, 1-octene, 1-nonene, 1-decene, 1-tetradecene, 1-hexadecene, 1-octadecene, and 1-eicosene.

A foaming ratio of the foamed synthetic resin sheet is preferably 3 to 15 times, and more preferably 4 to 10 times. The foamed synthetic resin sheet having the foaming ratio of 3 times or more improves flexibility of the electret sheet and increases its deformation degree to a pressure, which increases the piezoelectricity of the electret sheet, and thus it is preferable. The foamed synthetic resin sheet having the foaming ratio of 15 times or less increases mechanical strength of the electret sheet and reduces its compression permanent set, allowing the electret sheet to maintain the excellent piezoelectricity over a long period, and thus it is preferable. Note that the foaming ratio of the foamed synthetic resin sheet is a value obtained by dividing a density of the whole synthetic resins constituting the foamed synthetic resin sheet by a density of the foamed synthetic resin sheet.

A thickness of the foamed synthetic resin sheet is preferably 10 to 300 μm, and more preferably 30 to 200 μm. The foamed synthetic resin sheet having the thickness of 10 μm or more can ensure the sufficient number of bubbles in a thickness direction, which increases the piezoelectricity of the electret sheet, and thus it is preferable. The foamed synthetic resin sheet having the thickness of 300 μm or less allows a cell wall of the electret sheet to be effectively charged in a polarization state and improves stability of the piezoelectricity of the electret sheet, and thus it is preferable.

A method of producing the foamed synthetic resin sheet is not particularly limited, and examples thereof include a method including: supplying the synthetic resin, a heat decomposable foaming agent, and if necessary, a polyfunctional monomer to an extruder; melting and kneading the mixture at a temperature lower than a decomposition temperature of the heat decomposable foaming agent; extruding a foamable synthetic resin sheet from a T-die attached to the extruder; crosslinking the foamable synthetic resin sheet as needed; and then heating the foamable synthetic resin sheet at a temperature equal to or higher than the decomposition temperature of the heat decomposable foaming agent so as to cause foaming, thereby producing the foamed synthetic resin sheet.

Examples of the heat decomposable foaming agent include azodicarbonamide, benzenesulfonyl hydrazide, dinitrosopentamethylenetetramine, toluenesulfonyl hydrazide, and 4,4-oxybis(benzenesulphonyl hydrazide).

The foamed synthetic resin sheet is preferably crosslinked using the polyfunctional monomer. Using the polyfunctional monomer can increase a crosslinking efficiency of the synthetic resin and allows the electret sheet to exhibit the excellent piezoelectricity even under light stress.

Examples of the polyfunctional monomer include divinylbenzene, trimethylolpropane tri(meth)acrylate, 1,6-hexanediol di(meth)acrylate, 1,9-nonanediol di(meth)acrylate, trimellitic acid triallyl ester, triethylene glycol diacrylate, tetraethylene glycol diacrylate, cyanoethyl acrylate, and bis(4-acryloxypolyethoxyphenyl)propane. Of these, trimethylolpropane tri(meth)acrylate, divinylbenzene, and 1,9-nonanediol di(meth)acrylate are preferable. Note that (meth)acrylate refers to methacrylate or acrylate.

The amount of the polyfunctional monomer is preferably 0.1 to 10 parts by mass, and preferably 0.5 to 8 parts by mass, relative to 100 parts by mass of the synthetic resin. The polyfunctional monomer contained in the amount of 0.1 parts by mass or more can sufficiently improve the crosslinking efficiency of the synthetic resin. The polyfunctional monomer contained in the amount of 10 parts by mass or less allows the electret sheet to exhibit the excellent piezoelectricity even under light stress.

In the production method described above, the foamable synthetic resin sheet is preferably aged. The aging of the foamable synthetic resin sheet allows residual strain in the synthetic resin to be released. Thereby, bubbles of the resulting foamed synthetic resin sheet become homogeneous and fine. The resulting electret sheet retains the high piezoelectricity under high-temperature condition.

An atmospheric temperature for aging the foamable synthetic resin sheet is preferably 20 to 70° C., and more preferably 20 to 50° C. The aging temperature of the foamable synthetic resin sheet being 20° C. or higher can shorten an aging time and increase the production efficiency of the foamed synthetic resin sheet. The aging temperature of the foamable synthetic resin sheet being 70° C. or lower makes the bubbles of the foamed synthetic resin sheet homogeneous and allows the resulting electret sheet to retain the high piezoelectricity even under high-temperature condition.

The aging time of the foamable synthetic resin sheet is preferably 1 to 120 hours, more preferably 2 to 72 hours, and particularly preferably 20 to 72 hours. The aging time of the foamable synthetic resin sheet being 1 hour or longer makes the bubbles of the resulting foamed synthetic resin sheet homogeneous and allows the resulting electret sheet to retain the high piezoelectricity even under high-temperature condition. The aging time of the foamable synthetic resin sheet being 120 hours or shorter enables to obtain the foamed synthetic resin sheet having excellent surface smoothness and allows the electret sheet to retain the high piezoelectricity even under high-temperature condition.

For the purpose of improving an electric charge retention capacity of the foamed synthetic resin sheet, the foamed synthetic resin sheet is preferably stretched, more preferably uniaxially stretched, and particularly preferably uniaxially stretched only in a direction orthogonal to an extrusion direction. Examples of the stretching method of the foamed synthetic resin sheet include (1) a uniaxial stretching method in which the foamed synthetic resin sheet is stretched in a longitudinal direction (an extrusion direction) or a width direction (a direction orthogonal to the extrusion direction), (2) a biaxial stretching method in which the foamed synthetic resin sheet is stretched both in the longitudinal direction (the extrusion direction) and the width direction (the direction orthogonal to the extrusion direction), (3) a stretching method in which the foamed synthetic resin sheet is stretched in the longitudinal direction (the extrusion direction) while fixing the foamed synthetic resin sheet in the width direction (the direction orthogonal to the extrusion direction), and (4) a stretching method in which the foamed synthetic resin sheet is stretched in the width direction (the direction orthogonal to the extrusion direction) while fixing the foamed synthetic resin sheet in the longitudinal direction (the extrusion direction).

The electret sheet is constituted by charging the porous sheet. A method of charging the porous sheet is not particularly limited, and examples thereof include a method of applying a direct-current electric field to the porous sheet.

The method of applying a direct-current electric field to the porous sheet is not particularly limited, and examples thereof include (1) a method of charging the porous sheet by holding the porous sheet between a pair of plate electrodes, connecting the plate electrode in contact with a surface of the porous sheet to be charged to a high-voltage direct-current power supply while grounding the other plate electrode, and applying a direct-current or pulsed high voltage to the porous sheet to inject electric charges into the synthetic resin, and (2) a method of charging the porous sheet by overlaying a grounded plate electrode on a first surface of the porous sheet in tight contact with each other, arranging needle-like electrodes or wire electrodes electrically connected to a direct-current high-voltage power supply at the side of a second surface of the porous sheet at predetermined intervals, generating corona discharge by electric field concentration near tips of the needle-like electrodes or surfaces of the wire electrodes to ionize air molecules, and repulsing air ions generated by the polarity of the needle-like electrodes or the wire electrodes.

An absolute value of a direct-current processing voltage for applying the direct-current electric field to the porous sheet is preferably 5 to 40 kV, and more preferably 10 to 30 kV. Adjusting the direct-current processing voltage within the above-described range improve the retention of the piezoelectricity of the resulting electret sheet at a high temperature.

The volume resistivity of the electret sheet at 25° C. is $1.0 \times 10^{15}$ Ω·cm or more, preferably $1.0 \times 10^{15}$ to $1.0 \times 10^{18}$ Ω·cm, and more preferably $1.0 \times 10^{16}$ to $1.0 \times 10^{18}$ Ω·cm. The electret sheet having the volume resistivity of $1.0 \times 10^{15}$ Ω·cm or more at 25° C. is excellent in retention of the piezoelectricity under a high-temperature atmosphere. The electret sheet having the volume resistivity of $1.0 \times 10^{18}$ Ω·cm or less at 25° C. hardly generates static electricity on the surface of the electret sheet and prevents internal electric charges from being discharged. This improves the retention of the piezoelectricity of the electret sheet, and thus it is preferable.

The volume resistivity of the electret sheet at 37° C. is preferably $1.0 \times 10^{14}$ Ω·cm or more, more preferably $1.0 \times 10^{15}$ to $1.0 \times 10^{18}$ Ω·cm, and particularly preferably $1.0 \times 10^{16}$ to $1.0 \times 10^{17}$ Ω·cm. The electret sheet having the volume resistivity of $1.0 \times 10^{14}$ Ω·cm or more at 25° C. is excellent in retention of the piezoelectricity under a high-temperature atmosphere. The electret sheet having the volume resistivity of $1.0 \times 10^{18}$ Ω·cm or less at 25° C. hardly generates static electricity on the surface of the electret sheet and prevents internal electric charges from being discharged. This improves the retention of the piezoelectricity of the electret sheet, and thus it is preferable.

The volume resistivity of the electret sheet at 50° C. is preferably $1.0 \times 10^{14}$ Ω·cm or more, more preferably $1.0 \times 10^{14}$ to $1.0 \times 10^{18}$ Ω·cm, and particularly preferably $1.0 \times 10^{15}$ to $1.0 \times 10^{17}$ Ω·cm. The electret sheet having the volume resistivity of $1.0 \times 10^{14}$ Ω·cm or more at 25° C. is excellent in retention of the piezoelectricity under a high-temperature atmosphere. The electret sheet having the volume resistivity of $1.0 \times 10^{18}$ Ω·cm or less at 25° C. hardly generates static electricity on the surface of the electret sheet and prevents internal electric charges from being discharged. This improves the retention of the piezoelectricity of the electret sheet, and thus it is preferable.

The volume resistivity of the electret sheet at a measuring temperature is measured as described below. Specifically, a test piece having a flat square shape of which one side was 10 cm was obtained and placed on a back-surface electrode under an atmosphere of a predetermined temperature and a relative humidity of 65%. After leaving the test piece for 10 minutes, a front-surface electrode was placed on the test piece and a voltage of 500 V was applied between both electrodes. A resistance (R [Ω]) was measured one minute after the application of voltage and the volume resistivity (ρ[Ω·cm]) was calculated on the basis of the following formula. A load applied to the test piece by the front-surface and back-surface electrodes during the measurement was adjusted to 5 kPa or less.

ρ=(π×d²/4t)×R

ρ: Volume resistivity of electret sheet [Ω·cm]
π: Ratio of circle's circumference to its diameter (3.14)
d: Diameter of front-surface electrode (5 [cm])
t: Thickness of test piece (0.01 [cm])
R: Resistance [Ω]

The volume resistivity of the electret sheet can be measured, for example, by using a detector (a digital ultrahigh resistance/microammeter 8340A manufactured by ADC Corp.) and a measurement electrode capable of controlling a temperature (a resistivity chamber 12708 manufactured by ADC Corp.).

A method of controlling the volume resistivity of the electret sheet at a predetermined temperature within the above-described range is not particularly limited, and examples thereof include a method of adjusting the weight-average molecular weight of the synthetic resin constituting the porous sheet forming the electret sheet, and a method of adjusting the melt flow rate of the synthetic resin constituting the porous sheet forming the electret sheet.

The volume resistivity of the electret sheet under a constant pressure load of 100 kPa at 25° C. is preferably $1.0 \times 10^{15}$ Ω·cm or more, more preferably $1.0 \times 10^{15}$ to $1.0 \times 10^{18}$ Ω·cm, and particularly preferably $1.0 \times 10^{16}$ to $1.0 \times 10^{18}$ Ω·cm. The electret sheet having the volume resistivity of $1.0 \times 10^{15}$ Ω·cm or more under the constant pressure load of 100 kPa is excellent in retention of the piezoelectricity under a high-temperature atmosphere. The electret sheet having the volume resistivity of $1.0 \times 10^{18}$ Ω·cm or less under the constant pressure load of 100 kPa hardly generates static electricity on the surface of the electret sheet and prevents internal electric charges from being discharged. This improves the retention of the piezoelectricity of the electret sheet, and thus it is preferable.

The volume resistivity of the electret sheet under a constant pressure load of 200 kPa at 25° C. is preferably $1.0 \times 10^{14}$ Ω·cm or more, more preferably $1.0 \times 10^{15}$ to $1.0 \times 10^{17}$ Ω·cm, and particularly preferably $1.0 \times 10^{16}$ to $1.0 \times 10^{17}$ Ω·cm. The electret sheet having the volume resistivity of $1.0 \times 10^{14}$ Ω·cm or more under the constant pressure load of 200 kPa is excellent in retention of the piezoelectricity under a high-temperature atmosphere. The electret sheet having the volume resistivity of $1.0 \times 10^{17}$ Ω·cm or less under the constant pressure load of 200 kPa hardly generates static electricity on the surface of the electret sheet and prevents internal electric charges from being discharged. This improves the retention of the piezoelectricity of the electret sheet, and thus it is preferable.

The volume resistivity of the electret sheet under a predetermined constant pressure load at 25° C. is measured as described below. Specifically, a test piece having a flat square shape of which one side was 10 cm was obtained and placed on a back-surface electrode under an atmosphere of 25° C. and a relative humidity of 65%. After leaving the test piece for 10 minutes, a front-surface electrode was placed on the test piece to hold the test piece between the front-surface and back-surface electrodes. The front-surface and back-surface electrodes were adjusted so as to apply a predetermined constant pressure load to the test piece. Next, the resistance (R [Ω]) was measured one minute after a voltage of 500 V was applied between both electrodes. The volume resistivity (ρ [Ω·cm]) was calculated on the basis of the following formula.

ρ=(π×d²/4t)×R

ρ: Volume resistivity of electret sheet [Ω·cm]
π: Ratio of circle's circumference to its diameter (3.14)
d: Diameter of front-surface electrode (5 [cm])
t: Thickness of test piece (0.01 [cm])
R: Resistance [Ω]

The volume resistivity of the electret sheet can be measured by using the aforementioned detector and measurement electrode capable of controlling a temperature.

A method of controlling the volume resistivity of the electret sheet under a predetermined constant pressure load at 25° C. within the above-described range is not particularly limited, and examples thereof include a method of adjusting the weight-average molecular weight of the synthetic resin constituting the porous sheet forming the electret sheet, and a method of adjusting the melt flow rate of the synthetic resin constituting the porous sheet forming the electret sheet.

The volume resistivity of the electret sheet at 25° C. and a relative humidity of 60% is preferably $1.0 \times 10^{15}$ Ω·cm or more, more preferably $1.0 \times 10^{15}$ to $1.0 \times 10^{18}$ Ω·cm, and particularly preferably $1.0 \times 10^{16}$ to $1.0 \times 10^{18}$ Ω·cm. The electret sheet having the volume resistivity of $1.0 \times 10^{15}$ Ω·cm or more at 25° C. and the relative humidity of 60% is excellent in retention of the piezoelectricity under a high-temperature atmosphere. The electret sheet having the volume resistivity of $1.0 \times 10^{18}$ Ω·cm or less at 25° C. and the relative humidity of 60% hardly generates static electricity on the surface of the electret sheet and prevents internal electric charges from being discharged. This improves the retention of the piezoelectricity of the electret sheet, and thus it is preferable.

The volume resistivity of the electret sheet at 25° C. and a relative humidity of 90% is preferably $1.0 \times 10^{13}$ Ω·cm or more, more preferably $1.0 \times 10^{14}$ to $1.0 \times 10^{18}$ Ω·cm, and particularly preferably $1.0 \times 10^{15}$ to $1.0 \times 10^{18}$ Ω·cm. The electret sheet having the volume resistivity of $1.0 \times 10^{13}$ Ω·cm or more at 25° C. and the relative humidity of 90% is excellent in retention of the piezoelectricity under a high-temperature atmosphere. The electret sheet having the volume resistivity of $1.0 \times 10^{18}$ Ω·cm or less at 25° C. and the relative humidity of 90% hardly generates static electricity on the surface of the electret sheet and prevents internal electric charges from being discharged. This improves the retention of the piezoelectricity of the electret sheet, and thus it is preferable.

The volume resistivity of the electret sheet at 25° C. and a relative humidity for measurement is measured as described below. Specifically, a test piece having a flat square shape of which one side was 10 cm was obtained and placed on a back-surface electrode under an atmosphere of 25° C. and a predetermined relative humidity. After leaving the test piece for 10 minutes, a front-surface electrode was placed on the test piece and a voltage of 500 V was applied between both electrodes. The resistance (R [Ω]) was measured one minute after the application of voltage and the volume resistivity (ρ [Ω·cm]) was calculated on the basis of the following formula. A load applied to the test piece by the front-surface and back-surface electrodes during the measurement was adjusted to 5 kPa or less.

$\rho = (\pi \times d^2 / 4t) \times R$

ρ: Volume resistivity of electret sheet [Ω·cm]
π: Ratio of circle's circumference to its diameter (3.14)
d: Diameter of front-surface electrode (5 [cm])
t: Thickness of test piece (0.01 [cm])
R: Resistance ([Ω])

The volume resistivity of the electret sheet can be measured by using the aforementioned detector and measurement electrode capable of controlling a temperature.

A method of controlling the volume resistivity of the electret sheet at 25° C. and the relative humidity for measurement within the above-described range is not particularly limited, and examples thereof include a method of adjusting the weight-average molecular weight of the synthetic resin constituting the porous sheet forming the electret sheet, and a method of adjusting the melt flow rate of the synthetic resin constituting the porous sheet forming the electret sheet.

The dielectric breakdown voltage of the electret sheet at 25° C. is 7 kV or more, preferably 8 to 12 kV, and preferably 9 to 11 kV. The electret sheet having the dielectric breakdown voltage of 7 kV or more at 25° C. is excellent in retention of the piezoelectricity under a high-temperature atmosphere. The electret sheet having the dielectric breakdown voltage of 12 kV or less at 25° C. is easily charged into the inside of the electret sheet to exhibit an excellent charging property, and thus it is preferable.

The dielectric breakdown voltage of the electret sheet at 37° C. is preferably 7 kV or more, more preferably 7 to 11 kV, and particularly preferably 8 to 11 kV. The electret sheet having the dielectric breakdown voltage of 7 kV or more at 37° C. is excellent in retention of the piezoelectricity under a high-temperature atmosphere. The electret sheet having the dielectric breakdown voltage of 11 kV or less at 37° C. is easily charged into the inside of the electret sheet to exhibit an excellent charging property, and thus it is preferable.

The dielectric breakdown voltage of the electret sheet at 50° C. is preferably 6 kV or more, more preferably 6 to 10 kV, and particularly preferably 7 to 9 kV. The electret sheet having the dielectric breakdown voltage of 6 kV or more at 50° C. is excellent in retention of the piezoelectricity under a high-temperature atmosphere. The electret sheet having the dielectric breakdown voltage of 10 kV or less at 50° C. is easily charged into the inside of the electret sheet to exhibit an excellent charging property, and thus it is preferable.

Note that the dielectric breakdown voltage of the electret sheet at a measuring temperature refers to a voltage measured as described below. Specifically, the electret sheet is cut into a test piece having a flat square shape of which one side is 50 mm. A metal plate and acrylic plate having a flat square shape of which one side is 50 mm are prepared. The test piece is held between the metal plate and the acrylic plate under an atmosphere of the measuring temperature and a relative humidity of 50%. Note that the test piece is held between the metal plate and the acrylic plate to such an extent that a thickness of the test piece is not reduced (a constant pressure load of 5 kPa). Next, an electrode is inserted into a through hole formed in a central part of the acrylic plate and brought into contact with the test piece to apply a direct-current voltage to the test piece. If no electrical conduction occurs by the applied direct-current voltage for 30 seconds, the direct-current voltage to be applied to the test piece is increased by 0.5 kV. The direct-current voltage applied to the test piece at the time of dielectric breakdown caused by the electrical conduction occurring in less than 30 seconds is defined as the dielectric breakdown voltage. The dielectric breakdown voltage of the electret sheet at the measuring temperature can be measured, for example, by using a measurement device commercially available from Kikusui Electronics Corp. under a trade name "TOS5101."

A method of controlling the dielectric breakdown voltage of the electret sheet at a predetermined temperature within the above-described range is not particularly limited, and examples thereof include a method of adjusting the volume resistivity of the synthetic resin constituting the porous sheet forming the electret sheet, and a method of adjusting the weight-average molecular weight of the synthetic resin constituting the porous sheet forming the electret sheet.

The dielectric breakdown voltage of the electret sheet under a constant pressure load of 100 kPa at 25° C. is preferably 5.5 kV or more, more preferably 6 to 9 kV, and particularly preferably 7 to 8 kV. The electret sheet having the dielectric breakdown voltage of 5.5 kV or more under the constant pressure load of 100 kPa is excellent in retention of the piezoelectricity under a high-temperature atmosphere. The electret sheet having the dielectric breakdown voltage of 9 kV or less under the constant pressure load of 100 kPa is easily charged into the inside of the electret sheet to exhibit an excellent charging property, and thus it is preferable.

The dielectric breakdown voltage of the electret sheet under a constant pressure load of 200 kPa at 25° C. is preferably 4 kV or more, more preferably 4.5 to 8 kV, and particularly preferably 6 to 7.5 kV. The electret sheet having the dielectric breakdown voltage of 4 kV or more under the constant pressure load of 200 kPa is excellent in retention of the piezoelectricity under a high-temperature atmosphere. The electret sheet having the dielectric breakdown voltage of 8 kV or less under the constant pressure load of 200 kPa is easily charged into the inside of the electret sheet to exhibit an excellent charging property, and thus it is preferable.

Note that the dielectric breakdown voltage of the electret sheet under a constant pressure load for measurement at 25° C. refers to a voltage measured as described below. Specifically, the electret sheet is cut into a test piece having a flat square shape of which one side is 50 mm. A metal plate and acrylic plate having a flat square shape of which one side is 50 mm are prepared. The test piece is held between the metal plate and the acrylic plate under an atmosphere of 25° C. and a relative humidity of 50%. Adjustment is made so as to apply the constant pressure load for measurement to the test piece. Next, an electrode is inserted into a through hole formed in a central part of the acrylic plate and brought into contact with the test piece to apply a direct-current voltage to the test piece. If no electrical conduction occurs by the applied direct-current voltage for 30 seconds, the direct-current voltage to be applied to the test piece is increased by 0.5 kV. The direct-current voltage applied to the test piece at the time of dielectric breakdown caused by the electrical conduction occurring in less than 30 seconds is defined as the dielectric breakdown voltage. The dielectric breakdown voltage of the electret sheet under the constant pressure load for measurement at 25° C. can be measured, for example, by using a measurement device commercially available from Kikusui Electronics Corp. under a trade name "TOS5101."

A method of controlling the dielectric breakdown voltage of the electret sheet under the constant pressure load for measurement at 25° C. within the above-described range is not particularly limited, and examples thereof include a method of adjusting the volume resistivity of the synthetic resin constituting the porous sheet forming the electret sheet, and a method of adjusting the weight-average molecular weight of the synthetic resin constituting the porous sheet forming the electret sheet.

A mechanism of improving the retention at a high temperature in the electret sheet having the volume resistivity and dielectric breakdown voltage within the aforementioned respective predetermined ranges under a predetermined constant pressure load at 25° C. is not yet clear. However, it is speculated that, even if molecular motion of a constituent material of the porous sheet forming the electret sheet increases at a high temperature, the electret sheet having the volume resistivity and dielectric breakdown voltage under the predetermined constant pressure load at 25° C. within the aforementioned ranges can maintain an intermolecular space to a certain level, and as a result, such an electret sheet can satisfactorily retain electric charges, which are obtained by charging in the porous sheet, even at a high temperature.

The dielectric breakdown voltage of the electret sheet at 25° C. and a relative humidity of 60% is preferably 6 kV or more, more preferably 6 to 12 kV, and particularly preferably 6 to 10 kV. The electret sheet having the dielectric breakdown voltage of 6 kV or more at 25° C. and the relative humidity of 60% is excellent in retention of the piezoelectricity under a high-temperature atmosphere. The electret sheet having the dielectric breakdown voltage of 12 kV or less at 25° C. and the relative humidity of 60% is easily charged into the inside of the electret sheet to exhibit an excellent charging property, and thus it is preferable.

The dielectric breakdown voltage of the electret sheet at 25° C. and a relative humidity of 90% is preferably 4 kV or more, more preferably 4 to 10 kV, and particularly preferably 4 to 8 kV. The electret sheet having the dielectric breakdown voltage of 4 kV or more at 25° C. and the relative humidity of 90% is excellent in retention of the piezoelectricity under a high-temperature atmosphere. The electret sheet having the dielectric breakdown voltage of 10 kV or less at 37° C. is easily charged into the inside of the electret sheet to exhibit an excellent charging property, and thus it is preferable.

Note that the dielectric breakdown voltage of the electret sheet at 25° C. and a relative humidity for measurement refers to a voltage measured as described below. Specifically, the electret sheet is cut into a test piece having a flat square shape of which one side is 50 mm. A metal plate and acrylic plate having a flat square shape of which one side is 50 mm are prepared. The test piece is held between the metal plate and the acrylic plate under an atmosphere of 25° C. and the relative humidity for measurement. Note that the test piece is held between the metal plate and the acrylic plate to such an extent that a thickness of the test piece is not reduced (a constant pressure load of 5 kPa). Next, an electrode is inserted into a through hole formed in a central part of the acrylic plate and brought into contact with the test piece to apply a direct-current voltage to the test piece. If no electrical conduction occurs by the applied direct-current voltage for 30 seconds, the direct-current voltage to be applied to the test piece is increased by 0.5 kV. The direct-current voltage applied to the test piece at the time of dielectric breakdown caused by the electrical conduction occurring in less than 30 seconds is defined as the dielectric breakdown voltage. The dielectric breakdown voltage of the electret sheet at a measuring temperature can be measured, for example, by using a measurement device commercially available from Kikusui Electronics Corp. under a trade name "TOS5101."

A method of controlling the dielectric breakdown voltage of the electret sheet at 25° C. and a predetermined relative humidity within the above-described range is not particularly limited, and examples thereof include a method of adjusting the volume resistivity of the synthetic resin constituting the porous sheet forming the electret sheet, and a method of adjusting the weight-average molecular weight of the synthetic resin constituting the porous sheet forming the electret sheet.

A mechanism of improving the retention at a high temperature in the electret sheet having the volume resistivity and dielectric breakdown voltage within the above-described respective predetermined ranges at 25° C. and a predetermined relative humidity is not yet clear. However, it is speculated that, even if molecular motion of a constituent material of the porous sheet forming the electret sheet increases at a high temperature, the electret sheet having the volume resistivity and dielectric breakdown voltage within the above-described ranges at 25° C. and the predetermined relative humidity can maintain an intermolecular space to a certain level, and as a result, such an electret sheet can satisfactorily retain electric charges, which are obtained by charging in the porous sheet, at a high temperature.

Next, the electret sheet according to a second aspect of the invention will be described. The electret sheet according to the second aspect of the invention is characterized by including a charged porous sheet, in which the electret sheet has the volume resistivity of $1.0 \times 10^{15}$ Ω·cm or more under a constant pressure load of 100 kPa at 25° C. and the dielectric breakdown voltage of 5.5 kV or more under a constant pressure load of 100 kPa at 25° C.

The porous sheet and the foamed synthetic resin sheet used in the electret sheet of the second aspect of the invention are the same as the porous sheet and the foamed synthetic resin sheet used in the electret sheet of the first aspect of the invention, and thus the repeated description is omitted. The synthetic resin constituting the foamed synthetic resin sheet is the same as the synthetic resin constituting the foamed synthetic resin sheet used in the electret sheet of the first aspect of the invention, and thus the repeated description is omitted. The preferable ranges of the foaming ratio and the thickness of the foamed synthetic resin sheet are the same as the preferable ranges of the foaming ratio and the thickness of the foamed synthetic resin sheet used in the electret sheet of the first aspect of the invention, and thus the repeated description is omitted. The production method of the foamed synthetic resin sheet is the same as the production method of the foamed synthetic resin sheet used for the electret sheet of the first aspect of the invention, and thus the repeated description is omitted. The polyfunctional monomer, the preferable range of the amount of the polyfunctional monomer, and the heat decomposable foaming agent, used in the production of the foamed synthetic resin sheet, are the same as those respectively used in the production of the electret sheet of the first aspect of the invention, and thus the repeated description is omitted. The aging conditions (the atmospheric temperature and the aging time) of the foamable synthetic resin sheet are the same as the aging conditions (the atmospheric temperature and the aging time) of the foamable synthetic resin sheet optionally performed in the production of the electret sheet of the first aspect of the invention, and thus the repeated description is omitted. The stretching method of the foamed synthetic resin sheet is the same as the stretching method of the foamed synthetic resin sheet optionally performed in the production of the electret sheet of the first aspect of the invention, and thus the repeated description is omitted.

The electret sheet of the second aspect of the invention is constituted by charging the porous sheet. The method of charging the porous sheet is the same as that used for the electret sheet of the first aspect of the invention and thus the repeated description is omitted. The preferable range of the absolute value of the direct-current processing voltage for applying the direct-current electric field to the porous sheet is the same as that used for the electret sheet of the first aspect of the invention and thus the repeated description is omitted.

The volume resistivity of the electret sheet under a constant pressure load of 100 kPa at 25° C. is preferably $1.0 \times 10^{15}$ Ω·cm or more, more preferably $1.0 \times 10^{15}$ to $1.0 \times 10^{18}$ Ω·cm, and particularly preferably $1.0 \times 10^{16}$ to $1.0 \times 10^{18}$ Ω·cm. The electret sheet having the volume resistivity of $1.0 \times 10^{15}$ Ω·cm or more under the constant pressure load of 100 kPa is excellent in retention of the piezoelectricity under a high-temperature atmosphere. The electret sheet having the volume resistivity of $1.0 \times 10^{18}$ Ω·cm or less under the constant pressure load of 100 kPa hardly generates static electricity on the surface of the electret sheet and prevents internal electric charges from being discharged. This improves the retention of the piezoelectricity of the electret sheet, and thus it is preferable.

The volume resistivity of the electret sheet under a constant pressure load of 200 kPa at 25° C. is preferably $1.0 \times 10^{14}$ Ω·cm or more, more preferably $1.0 \times 10^{15}$ to $1.0 \times 10^{17}$ Ω·cm, and particularly preferably $1.0 \times 10^{16}$ to $1.0 \times 10^{17}$ Ω·cm. The electret sheet having the volume resistivity of $1.0 \times 10^{14}$ Ω·cm or more under the constant pressure load of 200 kPa is excellent in retention of the piezoelectricity under a high-temperature atmosphere. The electret sheet having the volume resistivity of $1.0 \times 10^{17}$ Ω·cm or less under the constant pressure load of 200 kPa hardly generates static electricity on the surface of the electret sheet and prevents internal electric charges from being discharged. This improves the retention of the piezoelectricity of the electret sheet, and thus it is preferable.

The volume resistivity of the electret sheet under a predetermined constant pressure load at 25° C. is measured as described below. Specifically, a test piece having a flat square shape of which one side was 10 cm was obtained and placed on a back-surface electrode under an atmosphere of 25° C. and a relative humidity of 65%. After leaving the test piece for 10 minutes, a front-surface electrode was placed on the test piece to hold the test piece between the front-surface and back-surface electrodes. The front-surface and back-surface electrodes were adjusted so as to apply the predetermined constant pressure load to the test piece. Next, the resistance (R [Ω]) was measured one minute after a voltage of 500 V was applied between both electrodes. The volume resistivity (ρ [Ω·cm]) was calculated on the basis of the following formula.

$\rho = (\pi \times d^2 / 4t) \times R$

ρ: Volume resistivity of electret sheet [Ω·cm]
π: Ratio of circle's circumference to its diameter (3.14)
d: Diameter of front-surface electrode (5 [cm])
t: Thickness of test piece (0.01 [cm])
R: Resistance ([Ω])

The volume resistivity of the electret sheet can be measured, for example, by using a detector (a digital ultrahigh resistance/microammeter 8340A manufactured by ADC Corp.) and a measurement electrode capable of controlling a temperature (a resistivity chamber 12708 manufactured by ADC Corp.).

A method of controlling the volume resistivity of the electret sheet under a constant pressure load for measurement at 25° C. within the above-described range is not particularly limited, and examples thereof include a method of adjusting the weight-average molecular weight of the synthetic resin constituting the porous sheet forming the electret sheet, and a method of adjusting the melt flow rate of the synthetic resin constituting the porous sheet forming the electret sheet.

The dielectric breakdown voltage of the electret sheet under a constant pressure load of 100 kPa at 25° C. is preferably 5.5 kV or more, more preferably 6 to 9 kV, and particularly preferably 7 to 8 kV. The electret sheet having the dielectric breakdown voltage of 5.5 kV or more under the constant pressure load of 100 kPa is excellent in retention of the piezoelectricity under a high-temperature atmosphere. The electret sheet having the dielectric breakdown voltage of 9 kV or less under the constant pressure load of 100 kPa is easily charged into the inside of the electret sheet to exhibit an excellent charging property, and thus it is preferable.

The dielectric breakdown voltage of the electret sheet under a constant pressure load of 200 kPa at 25° C. is preferably 4 kV or more, more preferably 4.5 to 8 kV, and particularly preferably 6 to 7.5 kV. The electret sheet having the dielectric breakdown voltage of 4 kV or more under the constant pressure load of 200 kPa is excellent in retention of the piezoelectricity under a high-temperature atmosphere. The electret sheet having the dielectric breakdown voltage of 8 kV or less under the constant pressure load of 200 kPa is easily charged into the inside of the electret sheet to exhibit an excellent charging property, and thus it is preferable.

Note that the dielectric breakdown voltage of the electret sheet under a constant pressure load for measurement at 25° C. refers to a voltage measured as described below. Specifically, the electret sheet is cut into a test piece having a flat square shape of which one side is 50 mm. A metal plate and acrylic plate having a flat square shape of which one side is 50 mm are prepared. The test piece is held between the metal plate and the acrylic plate under an atmosphere of 25° C. and a relative humidity of 50%. Adjustment is made so as to apply the constant pressure load for measurement to the test piece. Next, an electrode is inserted into a through hole formed in a central part of the acrylic plate and brought into contact with the test piece to apply a direct-current voltage to the test piece. If no electrical conduction occurs by the applied direct-current voltage for 30 seconds, the direct-current voltage to be applied to the test piece is increased by 0.5 kV. The direct-current voltage applied to the test piece at the time of dielectric breakdown caused by the electrical conduction occurring in less than 30 seconds is defined as the dielectric breakdown voltage. The dielectric breakdown voltage of the electret sheet at a measuring temperature can be measured, for example, by using a measurement device commercially available from Kikusui Electronics Corp. under a trade name "TOS5101."

A method of controlling the dielectric breakdown voltage of the electret sheet under a constant pressure load for measurement at 25° C. within the above-described range is not particularly limited, and examples thereof include a method of adjusting the volume resistivity of the synthetic resin constituting the porous sheet forming the electret sheet, and a method of adjusting the weight-average molecular weight of the synthetic resin constituting the porous sheet forming the electret sheet.

A mechanism of improving the retention at a high temperature in the electret sheet having the volume resistivity and dielectric breakdown voltage within the above-described respective predetermined ranges under the predetermined constant pressure load at 25° C. is not yet clear. However, it is speculated that, even if molecular motion of a constituent material of the porous sheet forming the electret sheet increases at a high temperature, the electret sheet having the volume resistivity and dielectric breakdown voltage within the above-described ranges under the predetermined constant pressure load at 25° C. can maintain an intermolecular space to a certain level, and as a result, such an electret sheet can satisfactorily retain electric charges, which are obtained by charging in the porous sheet, at a high temperature.

Next, the electret sheet according to a third aspect of the invention will be described. The electret sheet according to the third aspect of the invention is characterized by including a charged porous sheet, in which the electret sheet has the volume resistivity of $1.0 \times 10^{15}$ $\Omega \cdot cm$ or more at 25° C. and a relative humidity of 60%, and the dielectric breakdown voltage of 6 kV or more at 25° C. and a relative humidity of 60%.

The porous sheet and the foamed synthetic resin sheet used in the electret sheet of the third aspect of the invention are the same as the porous sheet and the foamed synthetic resin sheet used in the electret sheet of the first aspect of the invention, and thus the repeated description is omitted. The synthetic resin constituting the foamed synthetic resin sheet is the same as the synthetic resin constituting the foamed synthetic resin sheet used in the electret sheet of the first aspect of the invention, and thus the repeated description is omitted. The preferable ranges of the foaming ratio and the thickness of the foamed synthetic resin sheet are the same as the preferable ranges of the foaming ratio and the thickness of the foamed synthetic resin sheet used in the electret sheet of the first aspect of the invention, and thus the repeated description is omitted. The production method of the foamed synthetic resin sheet is the same as the production method of the foamed synthetic resin sheet used for the electret sheet of the first aspect of the invention, and thus the repeated description is omitted. The polyfunctional monomer, the preferable range of the amount of the polyfunctional monomer, and the heat decomposable foaming agent, used in the production of the foamed synthetic resin sheet, are the same as those respectively used in the production of the electret sheet of the first aspect of the invention, and thus the repeated description is omitted. The aging conditions (the atmospheric temperature and the aging time) of the foamable synthetic resin sheet are the same as the aging conditions (the atmospheric temperature and the aging time) of the foamable synthetic resin sheet optionally performed in the production of the electret sheet of the first aspect of the invention, and thus the repeated description is omitted. The stretching method of the foamed synthetic resin sheet is the same as the stretching method of the foamed synthetic resin sheet optionally performed in the production of the electret sheet of the first aspect of the invention, and thus the repeated description is omitted.

The electret sheet of the third aspect of the invention is constituted by charging the porous sheet. The method of charging the porous sheet is the same as that used for the electret sheet of the first aspect of the invention and thus the repeated description is omitted. The preferable range of the absolute value of the direct-current processing voltage for applying the direct-current electric field to the porous sheet is the same as that used for the electret sheet of the first aspect of the invention and thus the repeated description is omitted.

The volume resistivity of the electret sheet at 25° C. and a relative humidity of 60% is preferably $1.0 \times 10^{15}$ $\Omega \cdot cm$ or more, more preferably $1.0 \times 10^{15}$ to $1.0 \times 10^{18}$ $\Omega \cdot cm$, and particularly preferably $1.0 \times 10^{16}$ to $1.0 \times 10^{18}$ $\Omega \cdot cm$. The electret sheet having the volume resistivity of $1.0 \times 10^{15}$ $\Omega \cdot cm$ or more at 25° C. and the relative humidity of 60% is excellent in retention of the piezoelectricity under a high-temperature atmosphere. The electret sheet having the volume resistivity of $1.0 \times 10^{18}$ $\Omega \cdot cm$ or less at 25° C. and the relative humidity of 60% hardly generates static electricity on the surface of the electret sheet and prevents internal electric charges from being discharged. This improves the retention of the piezoelectricity of the electret sheet, and thus it is preferable.

The volume resistivity of the electret sheet at 25° C. and a relative humidity of 90% is preferably $1.0 \times 10^{13}$ $\Omega \cdot cm$ or more, more preferably $1.0 \times 10^{14}$ to $1.0 \times 10^{18}$ $\Omega \cdot cm$, and particularly preferably $1.0 \times 10^{15}$ to $1.0 \times 10^{18}$ Ω·cm. The electret sheet having the volume resistivity of $1.0 \times 10^{13}$ Ω·cm or more at 25° C. and the relative humidity of 90% is excellent in retention of the piezoelectricity under a high-temperature atmosphere. The electret sheet having the volume resistivity of $1.0 \times 10^{18}$ Ω·cm or less at 25° C. and the relative humidity of 90% hardly generates static electricity on the surface of the electret sheet and prevents internal electric charges from being discharged. This improves the retention of the piezoelectricity of the electret sheet, and thus it is preferable.

The volume resistivity of the electret sheet at 25° C. and a relative humidity for measurement is measured as described below. Specifically, a test piece having a flat square shape of which one side was 10 cm was obtained and placed on a back-surface electrode under an atmosphere of 25° C. and a predetermined relative humidity. After leaving the test piece for 10 minutes, a front-surface electrode was placed on the test piece. The resistance (R [Ω]) was measured 1 minute after a voltage of 500 V was applied between both electrodes. The volume resistivity (ρ[Ω·cm]) was calculated on the basis of the following formula. A load applied to the test piece by the front-surface and back-surface electrodes during the measurement was adjusted to 5 kPa or less.

$\rho = (\pi \times d^2 / 4t) \times R$

ρ: Volume resistivity of electret sheet [Ω·cm]

π: Ratio of circle's circumference to its diameter (3.14)

d: Diameter of front-surface electrode (5 [cm])

t: Thickness of test piece (0.01 [cm])

R: Resistance ([Ω])

The volume resistivity of the electret sheet can be measured, for example, by using a detector (a digital ultrahigh resistance/microammeter 8340A manufactured by ADC Corp.) and a measurement electrode capable of controlling a temperature (a resistivity chamber 12708 manufactured by ADC Corp.).

A method of controlling the volume resistivity of the electret sheet at 25° C. and the relative humidity for measurement within the above-described range is not particularly limited, and examples thereof include a method of adjusting the weight-average molecular weight of the synthetic resin constituting the porous sheet forming the electret sheet, and a method of adjusting the melt flow rate of the synthetic resin constituting the porous sheet forming the electret sheet.

The dielectric breakdown voltage of the electret sheet at 25° C. and a relative humidity of 60% is preferably 6 kV or more, more preferably 6 to 12 kV, and particularly preferably 6 to 10 kV. The electret sheet having the dielectric breakdown voltage of 6 kV or more at 25° C. and the relative humidity of 60% is excellent in retention of the piezoelectricity under a high-temperature atmosphere. The electret sheet having the dielectric breakdown voltage of 12 kV or less at 25° C. and the relative humidity of 60% is easily charged into the inside of the electret sheet to exhibit an excellent charging property, and thus it is preferable.

The dielectric breakdown voltage of the electret sheet at 25° C. and a relative humidity of 90% is preferably 4 kV or more, more preferably 4 to 10 kV, and particularly preferably 4 to 8 kV. The electret sheet having the dielectric breakdown voltage of 4 kV or more at 25° C. and the relative humidity of 90% is excellent in retention of the piezoelectricity under a high-temperature atmosphere. The electret sheet having the dielectric breakdown voltage of 10 kV or less at 37° C. is easily charged into the inside of the electret sheet to exhibit an excellent charging property, and thus it is preferable.

Note that the dielectric breakdown voltage of the electret sheet at 25° C. and a relative humidity for measurement refers to a voltage measured as described below. Specifically, the electret sheet is cut into a test piece having a flat square shape of which one side is 50 mm. A metal plate and acrylic plate having a flat square shape of which one side is 50 mm are prepared. The test piece is held between the metal plate and the acrylic plate under an atmosphere of 25° C. and the relative humidity for measurement. Note that the test piece is held between the metal plate and the acrylic plate to such an extent that a thickness of the test piece is not reduced (a constant pressure load of 5 kPa). Next, an electrode is inserted into a through hole formed in a central part of the acrylic plate and brought into contact with the test piece to apply a direct-current voltage to the test piece. If no electrical conduction occurs by the applied direct-current voltage for 30 seconds, the direct-current voltage to be applied to the test piece is increased by 0.5 kV. The direct-current voltage applied to the test piece at the time of dielectric breakdown caused by the electrical conduction occurring in less than 30 seconds is defined as the dielectric breakdown voltage. The dielectric breakdown voltage of the electret sheet at a measuring temperature can be measured, for example, by using a measurement device commercially available from Kikusui Electronics Corp. under a trade name "TOS5101."

A method of controlling the dielectric breakdown voltage of the electret sheet at 25° C. and the predetermined relative humidity within the above-described range is not particularly limited, and examples thereof include a method of adjusting the volume resistivity of the synthetic resin constituting the porous sheet forming the electret sheet, and a method of adjusting the weight-average molecular weight of the synthetic resin constituting the porous sheet forming the electret sheet.

A mechanism of improving the retention at a high temperature in the electret sheet having the volume resistivity and dielectric breakdown voltage within the above-described respective predetermined ranges at 25° C. and a predetermined relative humidity is not yet clear. However, it is speculated that, even if molecular motion of a constituent material of the porous sheet forming the electret sheet increases at a high temperature, the electret sheet having the volume resistivity and dielectric breakdown voltage within the above-described ranges at 25° C. and the predetermined relative humidity can maintain an intermolecular space to a certain level, and as a result, such an electret sheet can satisfactorily retain electric charges, which are obtained by charging in the porous sheet, at a high temperature.

A piezoelectric sensor configured from the electret sheet of any of the first to third aspects of the invention will be described. The piezoelectric sensor is configured by integrally laminating a signal electrode on a first surface of the electret sheet and integrally laminating a ground electrode on a second surface of the electret sheet. Then, a potential generated in the electret sheet of the piezoelectric sensor can be measured by measuring a potential of the signal electrode using the ground electrode as a reference electrode.

The signal electrode is integrally laminated on the first surface of the electret sheet optionally by the intermediary of a fixative. Similarly, the ground electrode is integrally laminated on the second surface of the electret sheet optionally by the intermediary of a fixative. Note that the signal electrode and the ground electrode are not particularly limited as long as they have conductivity, and examples thereof include a metal sheet such as a copper foil and an aluminum foil, and a conductive film.

When the signal electrode and the ground electrode are configured from the conductive film, the conductive film may be formed on an electric insulating sheet and then integrally laminated on the electret sheet or directly formed on the surface of the electret sheet. Examples of a method of forming the conductive film on the electric insulating sheet or the electret sheet include (1) a method of applying and drying a conductive paste prepared by including conductive fine particles in a binder onto the electric insulating sheet or the electret sheet, and (2) a method of forming an electrode on the electric insulating sheet or the electret sheet by means of vapor deposition.

The electric insulating sheet is not particularly limited as long as it has an electrical insulation property, and examples thereof include a polyimide sheet, a polyethylene terephthalate sheet, a polyethylene naphthalate sheet, and a polyvinyl chloride sheet.

The fixative constituting the fixative layer is composed of a reactive, solvent, water-based, or hot-melt adhesive or pressure sensitive adhesive. The fixative preferably has a low dielectric constant from the standpoint of maintaining the sensitivity of the electret sheet.

EXAMPLES

Next, Examples of the present invention will be described, however the present invention is not limited to the following Examples.

The following polypropylene-based resins A to E and polyethylene-based resins A and B were prepared.
[Polypropylene-based Resins]
Propylene-ethylene random copolymer (a polypropylene-based resin A, trade name "Novatec EG8B" manufactured by Japan Polypropylene Corp., ethylene unit content: 5% by mass)
Propylene-ethylene random copolymer (a polypropylene-based resin B, trade name "WINTEC WFW4" manufactured by Japan Polypropylene Corp., ethylene unit content: 2% by mass)
Propylene-ethylene random copolymer (a polypropylene-based resin C, trade name "WINTEC WFX4T" manufactured by Japan Polypropylene Corp., ethylene unit content: 4% by mass)
Propylene-ethylene random copolymer (a polypropylene-based resin D, trade name "WINTEC WEG7T" manufactured by Japan Polypropylene Corp., ethylene unit content: 1% by mass)
Propylene-ethylene random copolymer E (a polypropylene-based resin E, trade name "Prime Polypro B241" manufactured by Prime Polymer Co., Ltd., ethylene unit content: 2.5% by mass)
[Polyethylene-based Resins]
Linear low-density polyethylene (a polyethylene-based resin A, trade name "EXACT3027" manufactured by Exxon Chemical Co., Ltd.)
Low-density polyethylene (a polyethylene-based resin B, trade name "Novatec LE520H" manufactured by Japan Polypropylene Corp.)

Examples 1 to 5, Comparative Examples 1 and 2

The polypropylene-based resins A to E, the polyethylene-based resins A and B, trimethylolpropane trimethacrylate, azodicarbonamide, and a phenolic antioxidant were supplied to an extruder in respective predetermined amounts indicated in Table 1, molten and kneaded, and extruded into a sheet form through a T-die, to produce a foamable resin sheet having a thickness of 180 μm. The foamable resin sheet was cut into a flat square shape of which one side was 30 cm.

The resulting foamable resin sheet was aged at an atmospheric temperature of 25° C. for 48 hours. Both surfaces of the resulting foamable resin sheet were irradiated with an electron beam under conditions of an accelerating voltage of 500 kV and an intensity of 25 kGy, to crosslink the polyolefin-based resin constituting the foamable resin sheet. The crosslinked foamable resin sheet was heated at 250° C. to foam the foamable resin sheet, thereby obtaining a foamed polyolefin-based resin sheet. The resulting foamed polyolefin-based resin sheet was uniaxially stretched at a stretching rate of 900 mm/min in a direction orthogonal to an extrusion direction to a thickness of 200 μm using an automatic uniaxial stretching apparatus (trade name "IMC-18C6" manufactured by Imoto Machinery Co., Ltd.) while a surface temperature of the foamed polyolefin-based resin sheet was maintained at 130° C. The foamed polyolefin-based resin sheet having a thickness of 200 μm was thus obtained. Note that a foaming ratio and thickness of the foamed polyolefin-based resin sheet were shown in Table 1.

A grounded plate electrode was overlaid on a first surface of the foamed polyolefin-based resin sheet in tight contact with each other. Needle-like electrodes electrically connected to a direct-current high-voltage power supply were arranged on a second surface of the foamed polyolefin-based resin sheet at predetermined intervals. Corona discharge was generated by electric field concentration near the surfaces of the needle-like electrodes under conditions of a voltage of −10 kV, a discharge distance of 30 mm, and voltage application time of 10 seconds to ionize air molecules. A direct-current electric field was applied to the foamed polyolefin-based resin sheet by repulsion of air ions generated by the polarity of the needle-like electrodes, to inject electric charges into the foamed polyolefin-based resin sheet. The foamed polyolefin-based resin sheet was entirely charged in this manner. The foamed polyolefin-based resin sheet was subjected to the above-described charging treatment while a surface temperature of the foamed polyolefin-based resin sheet was maintained at 40° C. using a heat gun. Then, the foamed polyolefin-based resin sheet having the electric charges injected therein was maintained in a state of being wrapped with a grounded aluminum foil for 3 hours to obtain an electret sheet.

The resulting electret sheet was measured for the volume resistivity (relative humidity (RH): 65%, constant pressure load: 5 kPa or less) at 25° C., 37° C., and 50° C. and for the dielectric breakdown voltage (relative humidity (RH): 50%, constant pressure load: 5 kPa) at 25° C., 37° C., and 50° C. as described above. Results of the measurements were shown in Table 1.

The resulting electret sheet was measured for the volume resistivity (relative humidity (RH): 65%) under a constant pressure load of 100 kPa and 200 kPa at 25° C. and for the dielectric breakdown voltage (relative humidity (RH): 50%) under a constant pressure load of 100 kPa and 200 kPa at 25° C. as described above. Results of the measurements were shown in Table 1.

The resulting electret sheet was measured for the volume resistivity (constant pressure load: 5 kPa or less) at 25° C. and a relative humidity (RH) of 60%, the volume resistivity (constant pressure load: 5 kPa or less) at 25° C. and a relative humidity (RH) of 90%, the dielectric breakdown voltage (constant pressure load: 5 kPa) at 25° C. and a relative humidity (RH) of 60%, and the dielectric breakdown voltage (constant pressure load: 5 kPa or less) at 25° C. and a relative humidity (RH) of 90% as described above. Results of the measurements were shown in Table 1.

Each resulting electret sheet was measured for an initial piezoelectric constant d33 and a high-temperature piezoelectric constant d33 as described below. Results of the measurements were shown in Table 1.

(Piezoelectric Constant d33)

The electret sheet was cut into a test piece having a flat square shape of which one side was 10 mm. Both surfaces of the test piece were subjected to a gold vapor-deposition to prepare a test object.

A pressing force was applied to the test object using a vibration exciter under conditions of a load F of 2 N, a dynamic load of ±0.25 N, and a frequency of 110 Hz, and an electric charge Q (coulomb) generated in these conditions was measured. The piezoelectric constant d33 was calculated by dividing the electric charge Q (coulomb) by the load F (N). Note that, in a piezoelectric constant dij, j denotes a direction of the load and i denotes a direction of the electric charge, and thus the d33 represents the piezoelectric constant for the load in a thickness direction of the electret sheet and the electric charge in a thickness direction of the electret sheet.

The initial piezoelectric constant d33 was obtained by measuring the piezoelectric constant d33 of the electret sheet immediately after production.

The electret sheet wrapped with an aluminum foil was left in a thermo-hygrostat chamber under predetermined conditions [80° C.×a relative humidity (RH) of 65%, 50° C.×a relative humidity (RH) of 50%, or 50° C.×a relative humidity (RH) of 60%] for 1 week. Then, the electret sheet was left in a thermo-hygrostat chamber of 23° C. for 24 hours. The piezoelectric constant d33 of the electret sheet thus treated was measured to obtain the high-temperature piezoelectric constant d33.

TABLE 1

| | | | | | EXAMPLE | | | | | COMPARATIVE EXAMPLE | |
|---|---|---|---|---|---|---|---|---|---|---|---|
| | | | | 1 | 2 | 3 | 4 | 5 | 1 | 2 |
| COMPOSITION [PARTS BY MASS] | POLYPROPYLENE-BASED RESINS | A | NOVATEC EG8B | 100 | 0 | 0 | 0 | 0 | 0 | 0 |
| | | B | WINTEC WFW4 | 0 | 100 | 0 | 0 | 0 | 0 | 0 |
| | | C | WINTEC WFX4T | 0 | 0 | 100 | 0 | 0 | 0 | 0 |
| | | D | WINTEC WEG7T | 0 | 0 | 0 | 100 | 0 | 0 | 0 |
| | | E | PRIME POLYPRO B241 | 0 | 0 | 0 | 0 | 100 | 0 | 0 |
| | POLYETHYLENE-BASED RESINS | A | EXACT3027 | 0 | 0 | 0 | 0 | 0 | 100 | 0 |
| | | B | NOVATEC LE520H | 0 | 0 | 0 | 0 | 0 | 0 | 100 |
| | AZODICARBONAMIDE | | | 6 | 6 | 6 | 6 | 6 | 6 | 6 |
| | TRIMETHYLOLPROPANE TRIMETHACRYLATE | | | 3.3 | 3.3 | 3.3 | 3.3 | 3.3 | 3.3 | 0 |
| | PHENOLIC ANTIOXIDANT | | | 2 | 2 | 2 | 2 | 2 | 0 | 0 |
| ELECTRET SHEET EVALUATION | FOAMING RATIO (TIMES) | | | 7.8 | 8.2 | 8.3 | 7.5 | 7.8 | 7.7 | 8.2 |
| | THICKNESS (mm) | | | 0.23 | 0.21 | 0.23 | 0.22 | 0.20 | 0.21 | 0.21 |
| | VOLUME RESISTIVITY ($\times 10^{15}$ $\Omega \cdot$ cm) | 25° C., RH: 65%, CONSTANT PRESSURE LOAD: 5 kPa OR LESS | | 3220 | 480 | 117 | 673 | 142.5 | 0.527 | 0.489 |
| | | 37° C., RH: 65%, CONSTANT PRESSURE LOAD: 5 kPa OR LESS | | 3012 | 442 | 98 | 12 | 3.2 | 0.51 | 0.182 |
| | | 50° C., RH: 65%, CONSTANT PRESSURE LOAD: 5 kPa OR LESS | | 2155 | 152 | 80.2 | 6.48 | 0.61 | 0.431 | 0.068 |
| | | 25° C., RH: 65%, CONSTANT PRESSURE LOAD: 100 kPa | | 1536 | 342 | 88 | 455 | 48 | 0.097 | 0.221 |
| | | 25° C., RH: 65%, CONSTANT PRESSURE LOAD: 200 kPa | | 1232 | 212 | 23 | 311 | 5 | 0.017 | 0.089 |
| | | 25° C., RH: 60%, CONSTANT PRESSURE LOAD: 5 kPa OR LESS | | 3220 | 480 | 117 | 673 | 142.5 | 0.038 | 0.088 |
| | | 25° C., RH: 90%, CONSTANT PRESSURE LOAD: 5 kPa OR LESS | | 900 | 52 | 0.543 | 0.911 | 0.222 | 0.0025 | 0.01 |
| | DIELECTRIC BREAKDOWN VOLTAGE (kV) | 25° C., RH: 50%, CONSTANT PRESSURE LOAD: 5 kPa | | 9.5 | 9.0 | 9.0 | 7.5 | 7.0 | 5.0 | 4.0 |
| | | 37° C., RH: 50%, CONSTANT PRESSURE LOAD: 5 kPa | | 9.0 | 9.0 | 8.0 | 7.0 | 6.5 | 4.5 | 3.5 |
| | | 50° C., RH: 50%, CONSTANT PRESSURE LOAD: 5 kPa | | 9.0 | 9.0 | 7.5 | 7.0 | 6.5 | 3.5 | 3.0 |
| | | 25° C., RH: 50%, CONSTANT PRESSURE LOAD: 100 kPa | | 8.0 | 7.5 | 7.0 | 7.0 | 6.0 | 3.5 | 3.0 |
| | | 25° C., RH: 50%, CONSTANT PRESSURE LOAD: 200 kPa | | 7.5 | 7.0 | 6.0 | 5.5 | 4.5 | 2.5 | 2.0 |
| | | 25° C., RH: 60%, CONSTANT PRESSURE LOAD: 5 kPa | | 9.5 | 9.0 | 9.0 | 7.5 | 7.0 | 5.0 | 4.0 |
| | | 25° C., RH: 90%, CONSTANT PRESSURE LOAD: 5 kPa | | 7.5 | 7.5 | 7.0 | 5.0 | 4.5 | 3.0 | 2.5 |
| | INITIAL PIEZOELECTRIC CONSTANT d33 (pC/N) | | | 287 | 208 | 211 | 223 | 188 | 250 | 175 |
| | HIGH-TEMPERATURE PIEZOELECTRIC CONSTANT d33 (pC/N) | 80° C. × RH: 65% | | 189 | 125 | 148 | 60 | 45 | 0 | 0 |
| | | 50° C. × RH: 50% | | 165 | 133 | 141 | 91 | 48 | 0 | 0 |
| | | 50° C. × RH: 60% | | 142 | 118 | 98 | 78 | 63 | 0 | 0 |

INDUSTRIAL APPLICABILITY

The electret sheet of the present invention, which retains the high piezoelectricity under high-temperature condition, can be suitably used in an environment in which the electret sheet may be exposed to a high temperature during use (for example, for use in a vehicle such as an automobile, in a factory, in a cellular phone, in a smartphone, and the like).

CROSS-REFERENCE TO RELATED APPLICATIONS

The present application claims the priority under Japanese Patent Application No. 2016-19530 filed on Feb. 4, 2016, Japanese Patent Application No. 2016-19531 filed on Feb. 4, 2016, and Japanese Patent Application No. 2016-19535 filed on Feb. 4, 2016, which are hereby incorporated in their entirety by reference.

The invention claimed is:

1. An electret sheet for a piezoelectric sensor comprising a charged porous sheet, the electret sheet having a volume resistivity of $1.0 \times 10^{15}$ Ω·cm or more at 25° C. and a dielectric breakdown voltage of 7 kV or more at 25° C.,
   wherein the charged porous sheet is a foamed polypropylene-based synthetic resin sheet,
   the foamed polypropylene-based synthetic resin sheet comprises a polypropylene-based resin comprising a random copolymer of propylene and ethylene, and the charged porous sheet excludes a low-density polyethylene resin.

2. The electret sheet according to claim 1, having a volume resistivity of $1.0 \times 10^{14}$ Ω·cm or more at 37° C. and a dielectric breakdown voltage of 7 kV or more at 37° C.

3. The electret sheet according to claim 1, having a volume resistivity of $1.0 \times 10^{14}$ Ω·cm or more at 50° C. and a dielectric breakdown voltage of 6 kV or more at 50° C.

4. The electret sheet according to claim 1, having a volume resistivity of $1.0 \times 10^{15}$ Ω·cm or more under a constant pressure load of 100 kPa at 25° C. and a dielectric breakdown voltage of 5.5 kV or more under a constant pressure load of 100 kPa at 25° C.

5. The electret sheet according to claim 1, having a volume resistivity of $1.0 \times 10^{14}$ Ω·cm or more under a constant pressure load of 200 kPa at 25° C. and a dielectric breakdown voltage of 4 kV or more under a constant pressure load of 200 kPa at 25° C.

6. The electret sheet according to claim 1, having a volume resistivity of $1.0 \times 10^{15}$ Ω·cm or more at 25° C. and a relative humidity of 60% and a dielectric breakdown voltage of 6 kV or more at 25° C. and a relative humidity of 60%.

7. The electret sheet according to claim 1, having a volume resistivity of $1.0 \times 10^{13}$ Ω·cm or more at 25° C. and a relative humidity of 90% and a dielectric breakdown voltage of 4 kV or more at 25° C. and a relative humidity of 90%.

* * * * *